(12) United States Patent
Jogi et al.

(10) Patent No.: US 12,282,106 B2
(45) Date of Patent: Apr. 22, 2025

(54) DEVICES AND METHODS FOR SELECTING ANTENNAE FOR UWB RANGING

(71) Applicant: NXP B.V., Eindhoven (NL)

(72) Inventors: Sunil Dilipkumar Jogi, Bangalore (IN); Purnank Harjivanbhai Ghumalia, Bangalore (IN); Michael Schober, Graz (AT); Stefan Lemsitzer, Stainz (AT); Srivathsa Masthi Parthasarathi, Bangalore (IN); Guillaume Lepoittevin, Fontaine Etoupefour (FR)

(73) Assignee: NXP B.V., Eindhoven (NL)

( * ) Notice: Subject to any disclaimer, the term of this patent is extended or adjusted under 35 U.S.C. 154(b) by 298 days.

(21) Appl. No.: 18/181,645

(22) Filed: Mar. 10, 2023

(65) Prior Publication Data

US 2023/0305137 A1    Sep. 28, 2023

(30) Foreign Application Priority Data

Mar. 28, 2022 (EP) ..................... 22305383

(51) Int. Cl.
  *G01S 3/28* (2006.01)
  *G01S 13/76* (2006.01)
  *G01S 13/02* (2006.01)

(52) U.S. Cl.
  CPC ............. *G01S 3/28* (2013.01); *G01S 13/767* (2013.01); *G01S 13/0209* (2013.01); *H04B 2201/71634* (2013.01)

(58) Field of Classification Search
  CPC ...... G01S 3/28; G01S 13/767; G01S 13/0209; H04B 2201/71634
  See application file for complete search history.

(56) References Cited

U.S. PATENT DOCUMENTS

2004/0239562 A1   12/2004  Schantz
2022/0099790 A1*   3/2022  Lim .................... G01S 5/10

FOREIGN PATENT DOCUMENTS

CN    112448745 A      3/2021
CN    113391258 A  *   9/2021  ........... H04B 7/0413
(Continued)

OTHER PUBLICATIONS

Dalli, Anouar et al.; "Study of Circular Sector Patch Array Antenna with Two and Four Elements for C and X Band"; European Journal of Scientific Research, vol. 81 No. 2; Jul. 2012.
(Continued)

*Primary Examiner* — Donald J Wallace
*Assistant Examiner* — Ashley Brown Raynal (57) ABSTRACT

Disclosed are methods and devices for, UWB, ranging of a target using a plurality of antenna arrays. The method comprises: determining a first RSSI, from a first antenna of a first antenna arrays, and a second RSSI from a second antenna of a second antenna arrays; in response to the first RSSI being larger than the second RSSI, selecting the first antenna array, and selecting the second antenna array otherwise; using the selected antenna array, performing a UWB ranging measurement including measuring an angle of arrival of the signal from the target; including, if the angle of arrival of the signal from the target is out of range: selecting a different one of the plurality of antennae arrays, as a presently-selected antenna array; and, using that antenna array, performing a UWB ranging measurement including measuring an angle of arrival of the signal from the target.

15 Claims, 8 Drawing Sheets

(56) References Cited

FOREIGN PATENT DOCUMENTS

DE 102010019150 A1 11/2011
TW I565140 B 1/2017
WO 2016/124898 A1 8/2016

OTHER PUBLICATIONS

Luo, Yanjia et al.; "UWB Indoor Positioning Based On Uniform Circular Antenna Array"; 2008 11th IEEE Singapore International Conference on Communication Systems; Conference Date: Nov. 19-21, 2008, Guangzhou, China; DOI: 10.1109/ICCS.2008.4737159.
Rehmani, Mubashir Husain et al.; "Intelligent Antenna Selection Decision in IEEE 802.15.4 Wireless Sensor Networks: An Experimental Analysis"; Computers & Electrical Engineering, vol. 40, Issue 2; Jan. 2013; DOI:10.1016/j.compeleceng.2013.11.021.
Wu, Yuntao et al.; "Simple and Accurate Two-Dimensional Angle Estimation for a Single Source With Uniform Circular Array"; IEEE Antennas and Wireless Propagation Letters ( vol. 7); Date of Publication: Apr. 4, 2008; DOI: 10.1109/LAWP.2008.916687.

* cited by examiner

DEVICES AND METHODS FOR SELECTING ANTENNAE FOR UWB RANGING

CROSS-REFERENCE TO RELATED APPLICATIONS

This application claims priority under 35 U.S.C. § 119 to European Patent Application No. 22305383.6, filed on Mar. 28, 2022, the contents of which are incorporated by reference herein.

FIELD

The present disclosure relates to Ultra-wideband, UWB, devices and methods and in particular to devices and methods relating to UWB ranging including angle of arrival measurements.

BACKGROUND

Some UWB devices may have multiple antennae, antenna arrays or antenna pairs—generically known as "sectors", having different geometrical orientations. Antennae in these different sectors may be connected to dedicated UWB transceivers (or receivers and/or transmitters), or, for more efficient utilisation circuitry, any one of a plurality of antennae may be selectively routed to the same transceiver (or receiver and/or transmitter). In the case that a receiver is selectively connectable to an antenna in different sectors, pairs or arrays, for efficient UWB communication and particularly for UWB ranging including angle of arrival determination, it may be important to select the antenna (or antennae) from the correct sector to the receiver (or transmitter of transceiver). For example, a receiver in the wrong orientation may pick up a signal from a target which is a reflected signal, in preference to a direct (line of sight) signal: this may result in an incorrect calculation of the distance between the antennae and the target. Furthermore, it may result in a misleading or incorrect calculation of the angle between the target and the receiver.

SUMMARY

According to a first aspect of the present disclosure, there is provided a method of ultrawide band, UWB, ranging of a target using a plurality of antenna arrays, the method comprising: determining, from a signal from the target, a first received signal strength indicator, RSSI, from a first antenna of a first of said plurality of antenna arrays, determining from the signal from the target a second RSSI from a second antenna of a second of said plurality of antenna arrays; in response to the first RSSI being larger than the second RSSI, selecting the first antenna array, and selecting the second antenna array otherwise; using the selected antenna array, performing a UWB ranging measurement including measuring an angle of arrival of the signal from the target; wherein, in response to a one of: measuring an angle of arrival of the signal from the target producing a null result, and the measured angle of arrival falling outside of a predetermined field of view of the selected antenna array: selecting a one of the plurality of antennae arrays different from the first and second antenna arrays, as a presently-selected antenna array; and using the presently-selected antenna array, performing a UWB ranging measurement including measuring an angle of arrival of the signal from the target. By the above combination of RSSI measurements and establishing whether an angle of arrival is in range, the method provides an efficient means of establishing which sector (that is to say, antenna pair or antenna array) should be used for ranging.

According to one or more embodiments, each antenna array comprises at least antennae arranged in a first alignment. In one or more embodiments, each antenna array comprises at least 2 horizontally aligned antennae. The alignment typically defines a plane of measured angle of arrival. Typically, this plane is horizontal, and according to one or more embodiments, the antenna arrays are oriented around a 360° virtual field of view. This can provide for "all-round" sensing and ranging. As an example of an application of 360° horizontal sensing and ranging, this might allow UWB-controlled access to a vehicle, from a user approaching from any direction.

According to one or more embodiments, the plurality of antenna arrays is three antenna arrays, orientated at 120° to each other. Each antenna array may have a 120° field of view. In general, three sectors or antenna arrays having an angler separation of 120° is the minimum number needed to provide 360° coverage with a reasonable degree of reliability. A field of view of 120°, that is to say ±60° from the normal to the line connecting to antennae, has been found to provide a reasonable degree of accuracy.

According to one or more other embodiments the plurality of antenna arrays is four antenna arrays, being a first antenna array, a second antenna array, a third antenna array and a fourth antenna array. According to one or more embodiments each antenna array has a 90° field of view, although in other embodiments a wider field of view, such as 120° may also be appropriate. Embodiments which include four antenna arrays allows for mounting one of the antenna arrays on each side of a generally rectangular (in plan view) object such as a vehicle. Alternatively, four antenna arrays may be mounted one at each corner of a rectangle object such as a vehicle.

According to one or more embodiments selecting a one of the plurality of antennae arrays different from the first and second antenna arrays, as a presently-selected antenna array comprises: determining a third received signal strength indication, RSSI, from a third antenna of the third antenna array, determining a fourth RSSI from a fourth antenna of the fourth antenna array; in response to the third RSSI being larger than the fourth RSSI, selecting the third antenna array as a presently-selected antenna array, and selecting the fourth antenna array as the presently-selected antenna array otherwise; and using the presently-selected antenna array, performing a UWB ranging measurement including measuring an angle of arrival of a signal from the target. Selecting "opposite" pairs of antenna arrays for the first round of measurements from which the RSSI are determined may be efficient, since generally one or the other of the pair of antenna arrays will not be blocked by any substructure supporting the set of arrays (or by the object on which they are mounted). The array having the stronger RSSI would typically be facing the target and so it only remains to determine whether the angle of arrival of the signal from the target to that array is within angular acceptance range. For an angular acceptance range of 90° (that is to say ±45° from the normal), and a random angular distribution of the target, in 50% of cases the antenna array providing the stronger RSSI would measure the target as being in range.

According to a second aspect of the present disclosure, there is disclosed a UWB apparatus, comprising: a plurality of antenna arrays, each comprising a plurality of antennae; received signal strength circuitry configured to determine a received signal strength indicator (RSSI) at an antenna of the plurality of antenna arrays; a pair of receivers, each selectively connectable to any one of three or more antennae of the plurality of antenna arrays; wherein the apparatus is configured to: determine, from a signal from a target, a first received signal strength indication, RSSI, from a first antenna of a first of said plurality of antenna arrays, determine from the signal from the target a second RSSI from a second antenna of a second of said plurality of antenna arrays; in response to the first RSSI being larger than the second RSSI, select the first antenna array, and select the second antenna array otherwise; using the selected antenna array, perform a UWB ranging measurement including measure an angle of arrival of the signal from the target; and in response to a one of: measuring an angle of arrival of the signal from the target producing a null result, and the measured angle of arrival falling outside of a predetermined field of view of the selected antenna array: select a one of the plurality of antennae arrays different from the first and second antenna arrays, as a presently-selected antenna array; and using the presently-selected antenna array, perform a UWB ranging measurement including measuring an angle of arrival of the signal from the target.

In one or more embodiments each antenna array comprises at least 2 antennae arranged in a first alignment. In one or more embodiments, each antenna array comprises at least 2 horizontally aligned antennae. In one or more embodiments, the antenna arrays are oriented around a 360° virtual field of view. In one or more embodiments the plurality of antenna arrays is three antenna arrays, orientated at 120° to each other.

According to ⅓ aspect of the present disclosure, there is disclosed a method of ultrawide band, UWB, ranging of a target using a first, a second, and a third antenna array, the method comprising: determining a first received signal strength indication, RSSI, from a first antenna of the first antenna array; determining a second RSSI from a second antenna of the second antenna array; in response to the first RSSI being larger than the second RSSI, selecting the first antenna array, and selecting the second antenna array otherwise; using the selected antenna array, performing a UWB ranging measurement including measuring an angle of arrival of a signal from the target; wherein, in response to the measured angle of arrival falling outside of a predetermined field of view of the selected antenna array, the method further comprises: using the third antenna array, performing a UWB ranging measurement including measuring an angle of arrival of a signal from the target.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 1:
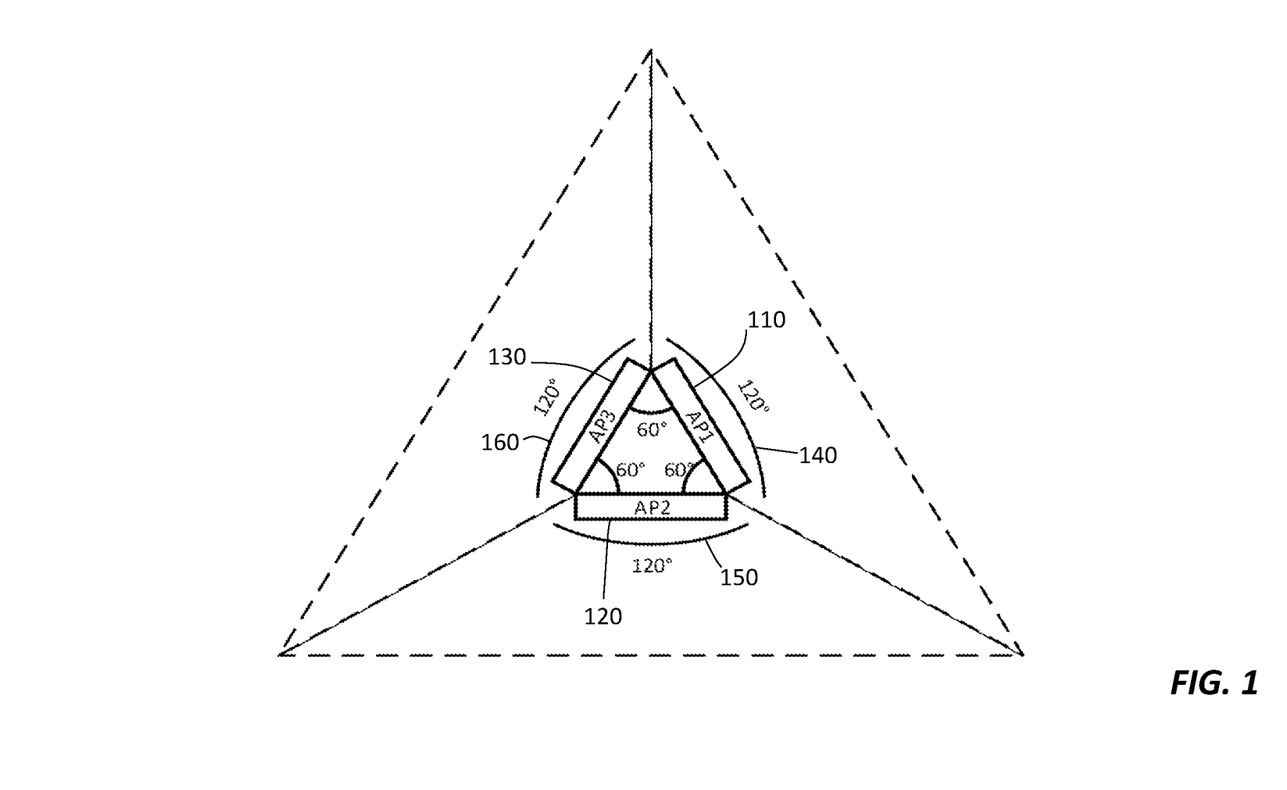
FIG. 1 shows, in plan view, a field of view of three antenna arrays or antenna pairs.

FIG. 1 shows a set of three antenna pairs (or more generically antenna arrays) 110, 120 and 130 equi-spaced around a 360° virtual field of view. Each antenna pair or antennae array can alternatively be described as a sector. For the following discussion, FIG. 1 shall be considered to be a plan view and thus a 360° virtual field of view lies in a horizontal plane, although the skilled person will appreciate that present disclosure is not limited to such an orientation. By appropriately selecting antenna pair AP1 110, AP2 120 or AP3 130, as receiving antenna, a signal from any orientation within the 360° virtual field of view may be received without obstruction or attenuation by the substructure or support, provided each antenna pair can receive signals from a respective 120° field of view 140, 150, 160 as shown. Moreover, it is known to use a pair (or more) of antennae spaced apart in one direction of a plane to determine an "angle of arrival" in that plane of a signal received at the pair of antennae, so, provided that each antenna pair has an effective field of view of 120°, or ±60° from a normal to a direction between the antennae, a signal may be received from anywhere in the horizontal plane, and the orientation of the signal relative to the set of antenna pairs determined.

One way to achieve this is to provide a pair of receivers for each antenna pair. In the example shown in FIG. 1 this would require three pairs of receivers. In other applications, more than three antenna pairs or antenna arrays may be configured around the 360° virtual field of view. For example, in automotive applications and other application having square, rectangular or circular form factors such as smart speakers, it is widely known to use four sectors, that is to say four antenna pairs or antenna arrays, one located at each corner of the vehicle, or alternatively one at each of the front and back of the vehicle and the one at each of the two sides of the vehicle. Such an application would require four pairs (or groups) of receivers.

As will be discussed in more detail below, a signal from a target is not generally clearly "visible" to all the antenna pairs AP1 110, AP2 120 and AP3 130. As a result, at least one of the pairs of receivers is redundant and by appropriately switching the antennae, or antenna pairs to receivers or receiver pairs, a smaller number of receivers or receiver pairs may be required than antennae or antenna pairs. In a limiting case, a single pair of receivers could be used and the antennae switched between them sequentially. However the routing of the signals from the antennae to the receivers is sensitive to noise, and it is preferable to minimise the number of switches in the signal path, since each degrades the signal to some extent. In practice, the signal may be received, and the orientation of the target relative to the set of antenna pairs may be efficiently determined using two receivers, for any orientation.

Figure 2:
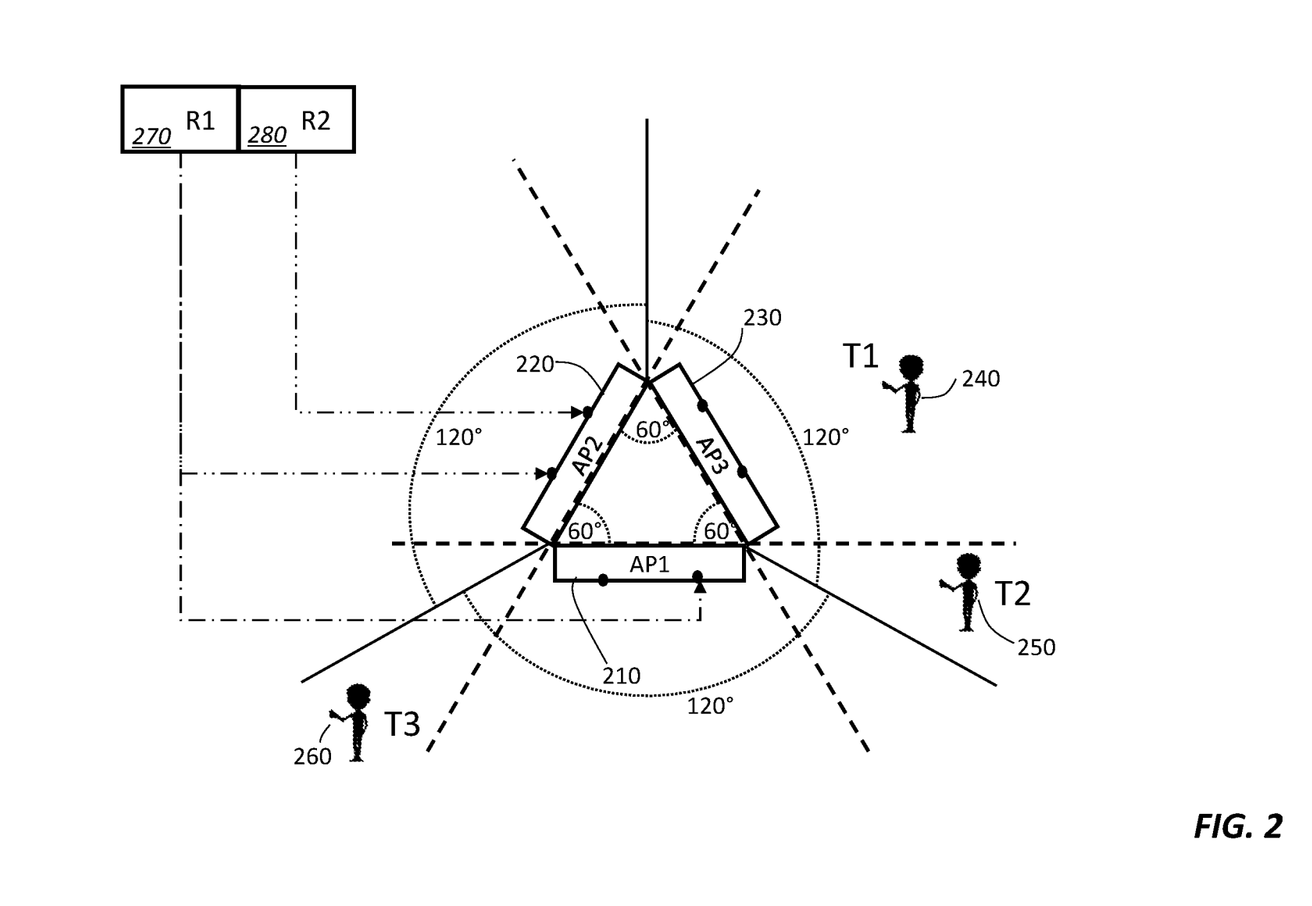
FIG. 2. shows connections between a set of three antenna pairs and a receiver pair.

The concept underlying the present disclosure may be better understood by referring to FIG. 2. This figure shows a set of three antenna pairs 210, 220 and 230, equi-spaced around a 360° virtual field of view. Also shown are three targets T1 240, T2 250 and T3 260.

Two receivers are available, first receiver R1 270, and second receiver R2 280, each of which can be switchably connected to different antennae. In particular, the two receivers can be configured as a receiver pair connected to a single antenna pair as shown by the double dotted lines connecting R1 and R2 to the two antennae of antenna AP2 220. Alternatively, the receivers can be connected to individual antennae from two different antenna pairs, as shown by the single dotted lines connecting R2 280 to one of the antennae of AP1 210 and connecting R1 270 to one of the antennae of AP2 220.

Ranging measurements, comprising both distance and angle of arrival measurements may then be efficiently performed as follows.

Initially the receivers are connected to antennae from separate antenna pairs. A first "round" of ranging measurement is performed by exchanging UWB signals between the initiator, and Target. This round does not include angle of arrival measurements, or even distance ranging. However, the strength of the signal received at each of AP1 and AP2 is measured as the respective RSSI (Received Signal Strength Indication). This results in any one of three possible scenarios: a first scenario is that a signal is received at neither antenna (or, equivalently, any received signal is extremely weak, so an RSSI cannot be effectively measured by either receiver). This could theoretically occur for instance for a target in orientation T1 240, although in practice, an antenna RSSI may be measurable even when the signal has to pass through any supporting substructure behind the antenna. A second scenario is that a significant RSSI can be measured from only one antenna. This can occur for instance for a target in orientation T2 250 (although, as just mentioned, typically an RSSI can be measured, even it is weak from a "hidden" or partially obscured antenna). A third scenario is that an RSSI can be measured from both connected antennae. This could occur for instance, with the target T3 260.

In the particular example shown, in which there are three antenna pairs arranged at 120° angles to each other, in the first scenario (weak or very weak RSSI at either receiver) it can be immediately deduced that the third antenna pair AP3 230 should be used for UWB. As a result, the receivers R1 and R2 270 and 280 are next connected one to each of the antenna pair AP3 230, and full UWB ranging (measuring both distance and angle of arrival) is performed using antenna pair AP3 230.

As a second step in the process according to either of the second or third scenarios, the two receivers are reconnected as a receiver pair to whichever of the two antenna pairs resulted in the stronger RSSI. In the second scenario mentioned above an antenna from only one pair received a direct signal so that is has stronger RSSI. In the example illustrated in FIG. 2, both the second and such third scenarios (corresponding to targets T2 and T3 respectively) result in the antenna of antenna pair AP1 210 receiving the stronger signal resulting in a larger RSSI.

A second UWB "round" is then undertaken using the connected pair of antennae (in this non-limiting example AP1). This typically includes both angle of arrival measurements and distance ranging, but may be limited to angle of arrival measurement only. Once again, this results in two possible scenarios: According to a first scenario, the angle of arrival (AoA) is within the field of view of the antenna pair, which typically is designed to be a 120° angle, that is to say between ±60° of the normal to the direction between the antenna pair. In this scenario, AP1 210 is the best antenna pair for the UWB ranging including AoA, and so is chosen for future UWB ranging activity. This corresponds to the orientation of target T3 260 in FIG. 2. According to a second scenario, the angle of arrival is not within the field of view of the antenna pair. The angle of arrival may not be measurable at all, or may result in an "out of range" (o.o.r) measurement—that is to say one which is more than 60° from the normal to the direction between the antenna pair. This corresponds to the orientation of target T2 250 in FIG. 2.

In the illustrated example in which there are three sets of antenna pairs spaced apart by 120° angles, it may be immediately deduced in the second scenario that the third antenna pair, AP3 is the best pair for UWB ranging. This results from the fact that the RSSI from the AP1 antenna was larger than that from the AP2 antenna, so the target (T2) is more likely to be in the field of view of AP1 than of AP2. And yet it is not in the right field of view of AP1. And since the three antenna pairs cover the complete 360° virtual field of view, it must be in the field of view of AP3.

Thus, according to one or more embodiments of the present disclosure the receivers R1 and R2 270 and 280 are then connected one to each of the antenna pair AP3 230, and UWB ranging (measuring both distance and angle of arrival) is performed using antenna pair AP3 230.

According to one or more other embodiments, one of the receivers is reconnected to one of the antennae of the third antenna pair AP3 230, and the other receiver remains connected to one of the antennae of the first antenna pair AP1 210. A second iteration of the first "round" of UWB ranging is then performed, in which neither distance nor angle of arrival are measured but the RSSI from the AP3 antenna and AP1 antenna are compared. The antenna pair corresponding to the larger RSSI is selected, the pair receivers connected to this antenna pair, and "full" UWB ranging, including both distance measurement and angle of arrival measurements is then undertaken. From the above discussion it is apparent that this option is effectively redundant in the case of three antenna pairs or sectors, although may be of value for embodiments having a larger number of antenna pairs or sectors.

Figure 4:
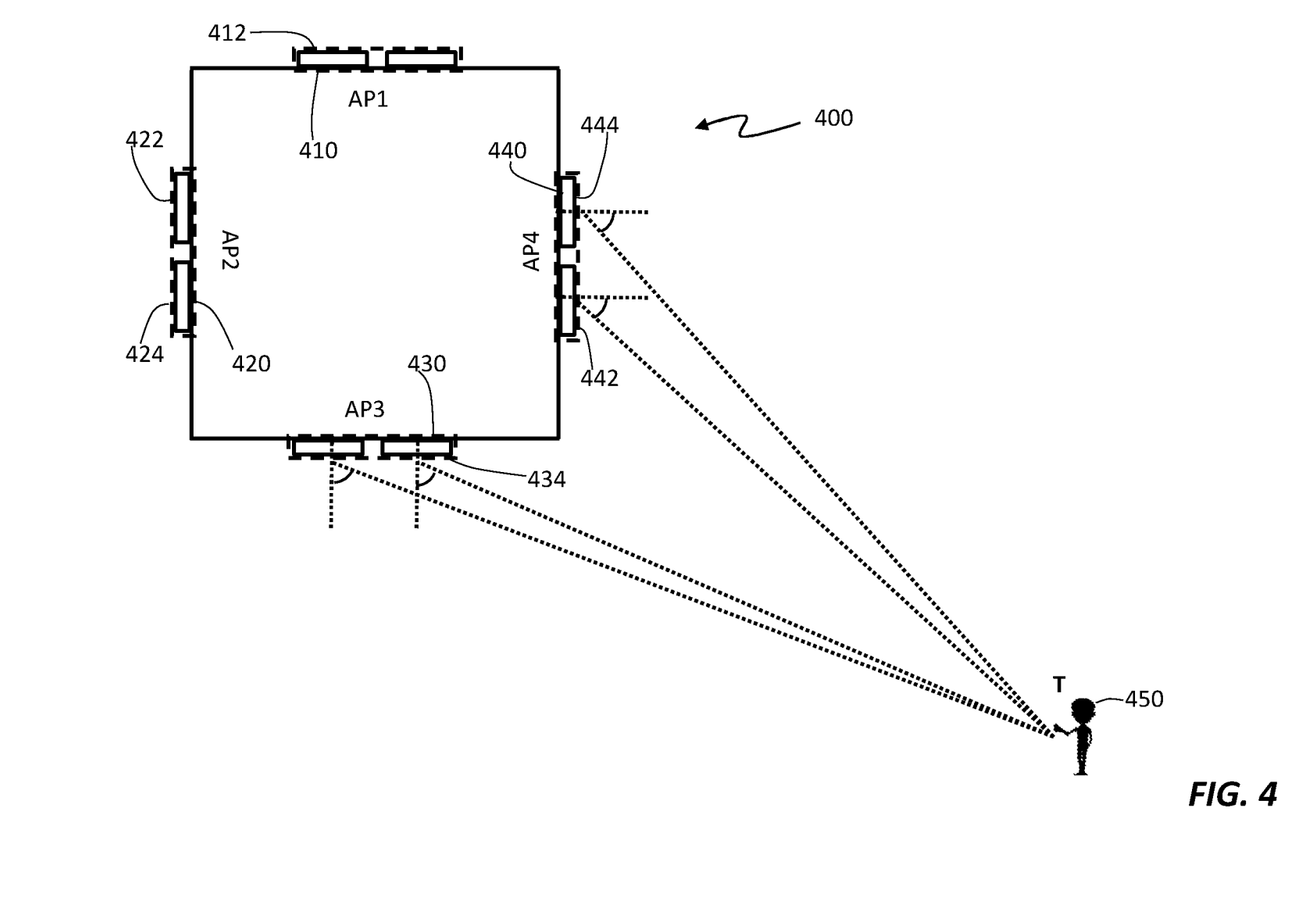
FIG. 4, shows an arrangement of antenna pairs configured for UWB ranging according to one or more other embodiments.

Turning now to FIG. 4, this shows an arrangement 400 of antenna pairs, AP1 410, AP2 420, AP3 430 and AP4 440 configured for UWB ranging according to one or more other embodiments. This arrangement includes four antenna pairs arranged around the 360° virtual field of view, and is a specific example of the case when there are more than three antenna pairs. In this instance the antenna pairs are equally spaced 90° apart, which may be the case for instance if the antenna pairs are located on the front, back, and two sides of a vehicle. In the example shown, the antenna pairs are arranged in a square configuration; however other configurations, such as rectangular configurations or even those which are not exactly equi-spaced at 90° such as a geometrical kite or rhombus configurations, are also possible.

The method described above requires to be modified in to accommodate more than three antenna pairs arranged around the 360° virtual field of view.

In an embodiment such as that shown in FIG. 4, there exists antenna pairs on "opposite" sides. For example, in the case of four antenna pairs, antenna pair AP1 410 and antenna pair AP3 430 are on opposite sides and antenna pair AP2 420 and antenna pair AP 440 are on opposite sides. In such an embodiment, the two antennae which are initially connected to determine the stronger RSSI are chosen from opposite sides. For example in the embodiment shown in FIG. 4 antenna 412, being one of the antenna pair AP1 410, is chosen along with antenna 434, being one of the antenna pair AP3 430.

The stronger of the two RSSI measurements of the signals received at antennae 412 and 434 would indicate where the target is "in front" (i.e. above 410 in the figure) or "behind" (i.e. below 430 in the figure) the arrangement 400. However, it cannot yet be determined whether the target is to the "right" or "left" of the arrangement 400. To determine this, another "round" of UWB signal exchange, from which RSSI measurements are determined is performed using an antenna 422 of antenna pair AP2 420, and an antenna 444 of antenna pair AP4 440. From these measurements may be determined whether the target is to be "left" or "right" of the arrangement 400. In the instance shown in FIG. 4 the target 450 is below and to the right of the arrangement 400.

The stronger of the two RSSIs measured in the first round may then be compared with the stronger RSSI from the second round. From the stronger of those two are exercise, it may determined which antenna pair should be used for the subsequent round of UWB ranging including angle of arrival measurement. For instance in the example shown, the RSSI at antenna 434 would be stronger than the RSSI at antenna 412, and the RSSI from 444 would be stronger than the RSSI from antenna 422. The RSSI at antenna 444 would be stronger than the RSSI at antenna 434. In consequence the antenna pair 440 would be chosen for the subsequent UWB round of ranging.

It will be apparent to the skilled person, that in the configuration where there are four antenna pairs, it is possible to achieve complete coverage for the 360° virtual field of view if the effective field of view for each antenna pair is chosen to be 90° (that is to say, ±45° from the normal to the line connecting the pair of antennae). However, it will also be appreciated that a wider field of view for each antenna pair may be selected (for instance ±60° from the normal as per the three antenna pair situation). In this latter situation there will be an overlap between the effective angular fields of view of adjacent antenna pairs. This may be beneficial, particularly when considering "handover" of a target from one antenna pair to another antenna pair resulting from relative movement of the target and arrangement.

Figure 5:
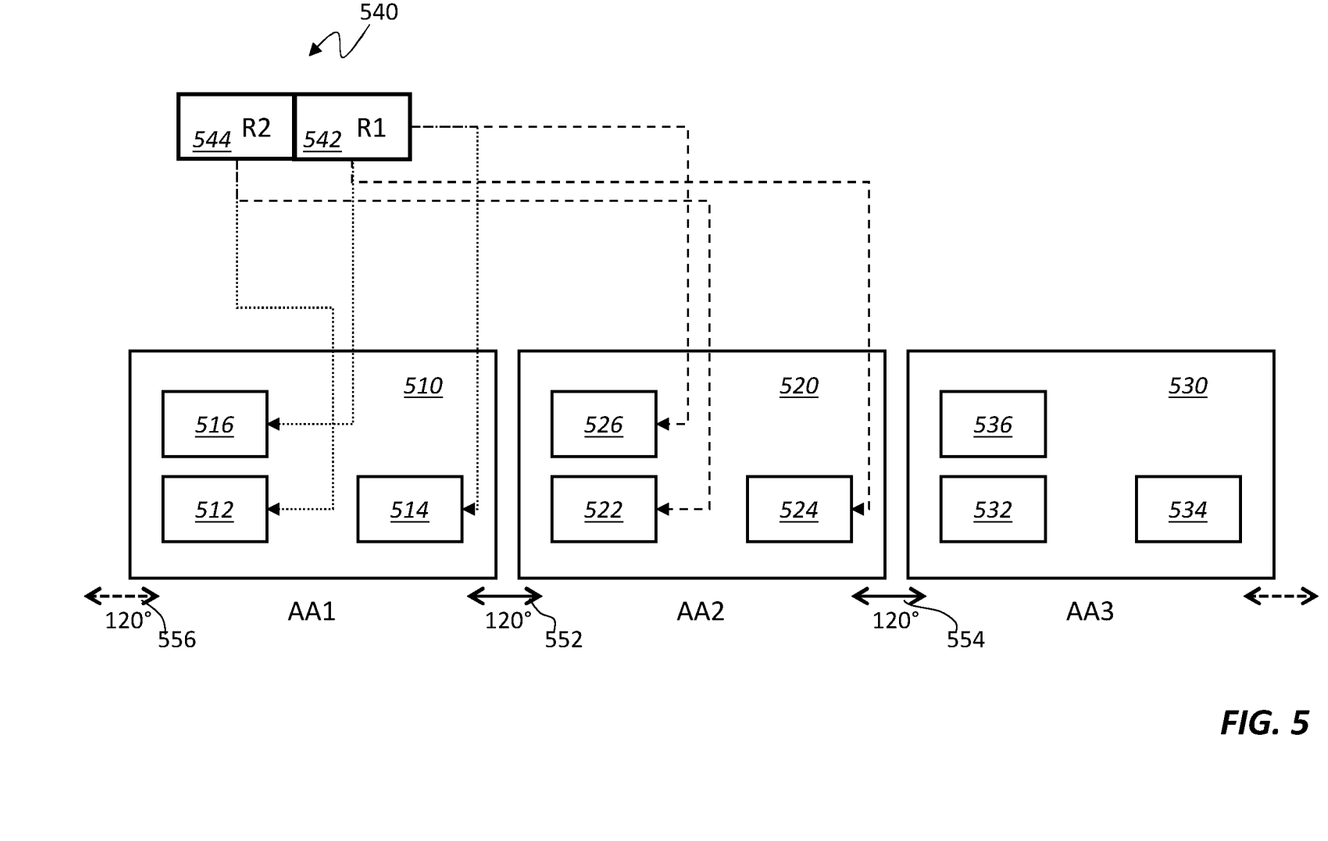
FIG. 5. shows conceptually three antenna arrays which are connectable to a pair of receivers, for UWB ranging according to one or more embodiments.

Consider now FIG. 5. This figure shows conceptually three antenna arrays AA1 510, AA2 520, and AA3 530, which are connectable to a pair 540 of receivers R1 542, and R2 544, for UWB ranging according to one or more embodiments. As can be seen, each of the antenna arrays comprises at least two antennae 514 and 512, 524 and 522, and 534 and 532 which are arranged in the same plane (which, as mentioned above, is typically but not necessarily horizontal). As illustrated schematically by 552, 554 and 556, the arrays AA1, AA2 and AA3 are arranged equally spaced around a 360° field of view. Shown in FIG. 5 are three such arrays and therefore their spacing is 120°; however, the skilled person will be will recognise that four or more such arrays may be used with correspondingly different angular spacing. The pairs of antennae 514 and 512, 524 and 522, and 534 and 532 correspond to the antenna pairs AP1, AP2 and AP3, discussed above with respect to the embodiment depicted in FIG. 2, and allow for UWB ranging including angle of incidence measurements in a horizontal plane, again as discussed above. However, as shown in each of the antenna arrays includes at least one further antenna (516, 526 and 536 respectively). At least one of the further antenna in each antenna array may be directly above (as shown) or below one of the respective antenna pair. That is to say, if the antenna pair (for instance 514 512) are horizontally aligned then one of the pair (512 as shown) and the further antenna (516) are vertically aligned. Whereas the horizontal alignment of antenna pair 514 and 512 provide for an angle of arrival measurement in a horizontal plane, the vertical alignment of antenna pair 512 and 516 provides for an angle of arrival measurement in a vertical plane. The further antenna 516 may be described as a "vertically specific" antenna (as may 526 and 536 correspondingly). As will be familiar to the skilled person, in most applications, and in automotive applications in particular, a lower angular measurement resolution is required in the vertical plane than in the horizontal plane, and as a result the vertical separation between the antennae 512 and 516 may be smaller than the horizontal separation between antennae 514 and 512.

According to one or more embodiments, in addition to being selectively connectable to the first antenna (514, 524, 534) of each of the antenna array (510, 520 530), the third receiver R1 542 is selectively connectable to any of the "vertically specific" antennae 516, 526, 536 for use in (vertical) angle of arrival measurements during UWB ranging. However, in this example the "vertically specific" antennae are not required for the first ranging "round", during which RSSI only is measured. These antennae are therefore be left disconnected during the first ranging "round". (The skilled person will appreciate that any one of the antennae in the sector could be chosen for the RSSI measurement and comparison; however, leaving the vertically specific antenna unconnected may reduce the switching requirements). During full UWB ranging, including both vertical and horizontal angle of arrival measurements, in this particular example the first receiver R1 542 is selectively connected to either the relevant first antenna 514, 512 or 516) in the selected antenna array (AA1 510, AA2 520 or AA3 530) or to the "vertically specific" antenna (516, 526 or 536)) in that antenna array antenna.

Figure 6:
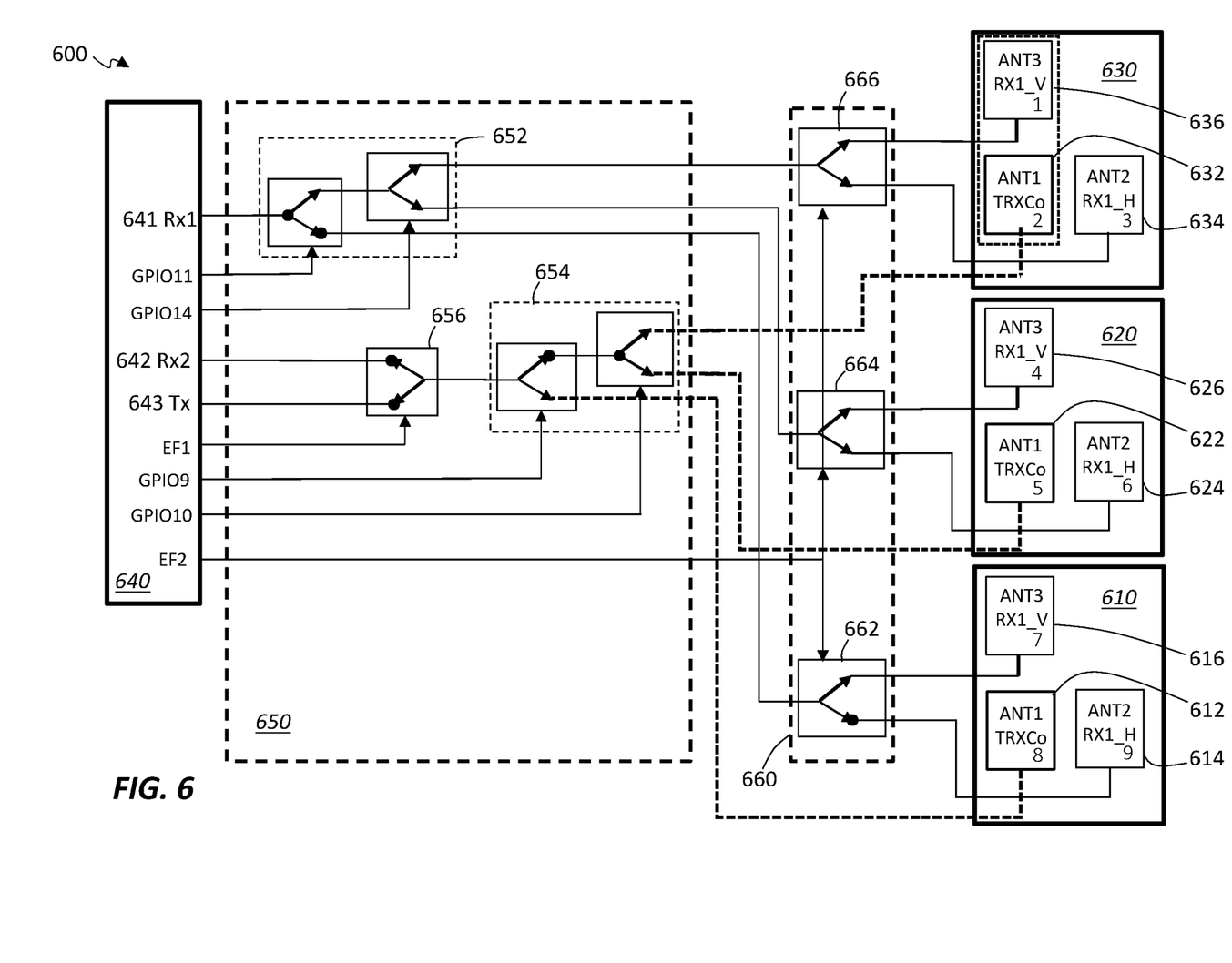
FIG. 6, shows a schematic arrangement of the connections between antenna arrays and a receiver pair according to embodiments of the present disclosure.

Turning now to FIG. 6, this shows, in more detail, a schematic arrangement 600 of the connections between antenna arrays and a receiver pair according to embodiments of the present disclosure. The arrangement shows three antenna arrays 610, 620 and 630, along with a receiver pair 640. Antenna array 610, which may also be called the first sector, includes three individual antennae ANT1 612, ANT2 614, and ANT3 616. ANT1 612 and ANT2 614 can cooperate as a pair of receiver antennae for angle of arrival measurements in a horizontal plane. Similarly, ANT1 612 and ANT3 616 can cooperate as a pair of receiver antennae for angle of arrival measurements in a vertical plane. Moreover, ANT1 612 is further configured to act as a transmitter antenna (and thus can be described as a common transceiver antenna, TRXCo), whereas ANT2 614 and ANT3 616 are for receiving only, (receiving antennae RX1_H, and RX1_V, respectively). A second sector or antenna array 620 comprises three antennae 622, 624 and 626 similarly configured. And a third sector or antenna array 630 comprises three other antennae 632, 634 and 636, also similarly configured.

Receiver pair 640 may, as shown, be implemented as a circuit, or IC or chip with appropriate input/output (I/O) ports. The receiver pair may also be integrated with a transmitter as shown in the embodiment of FIG. 6. The I/Os include a pair of receiver antenna inputs, Rx1 641 and Rx2 642 respectively, and a transmitter antenna output Tx 643.

Other I/O ports may be provided to control the various switches in a routing array. As shown, the routing array may include two parts 650 and 660. Part 660 provides for switching, for each antenna array or sector, between the horizontal pair of antennae ANT1 and ANT2, and the vertical pair of antennae ANT1 and ANT3. Since ANT1 is common to both the horizontal pair and vertical pair, 660 thus provides, for each antenna array or sector, a single pole double throw switch between ANT2 and ANT3. Thus 660 therefore comprises three switches 662, 664 and 666 for first, second, and third antenna arrays or sectors respectively. It will be appreciated that for embodiments which do not require angle of arrival measurement in a vertical plane, this part 660 of the routing array may not be required. The other part, 650, of the routing array performs three functions. Firstly, it is configured to connect the first receiver I/O port, Rx1 641, of the receiver pair to either antenna ANT2 or ANT3 (as determined by the switches in the first part 650) from any one of the first, second or third antenna arrays (i.e. 614/616, 624/626, or 634/636 respectively). This may be achieved by a single pole triple throw (SP3T) switch 652, which may, as shown, consist of a series pair of single pole double throw (SPDT) switches. Secondly, it is configured to connect the common antenna ANT1 for one of the antenna arrays (i.e. one of 612, 622, and 632), to a one of the second receiver port RX2 642 and the transmitter I/O port Tx 643. This may be achieved by a single pole triple throw (SP3T) switch 654, which may, as shown, consist of a series pair of single pole double throw (SPDT) switches. And thirdly, it is configured to select whether the connected transceiver antenna ANT1 is operating as a transmitting antenna or a receiving antenna. This is achieved by means of a single pole double throw switch 656 connected to the second receiver I/O port Rx2 642 and the transmitter I/O port Tx 643.

Circuitry to make the received signal strength measurements providing the RSSI values is generally provided "on chip" in the pair of receivers 640. However in some embodiments the RSSI circuitry may be provided elsewhere in the receiver circuitry.

The skilled person will appreciate that whereas FIG. 6 shows a single path connecting the relevant antennae from sectors 610, 620 and 630 to the receiver pair 640, which would imply a common ground path, one or more of the paths may include a pair of connecting wires or links. The switches, which are shown and described as single throw may in that case be replaced by corresponding double pole switches. The skilled person will also appreciate that the switches may conveniently be constructed of one or more switching FETs, and the control signals to the switches may be gate control signals.

Turning back now to FIG. 3, a typical set of ranging rounds for UWB will be described. The skilled person will appreciate that UWB ranging may include modifications or additions to the communications shown, depending on the specific circumstances.

Figure 3:
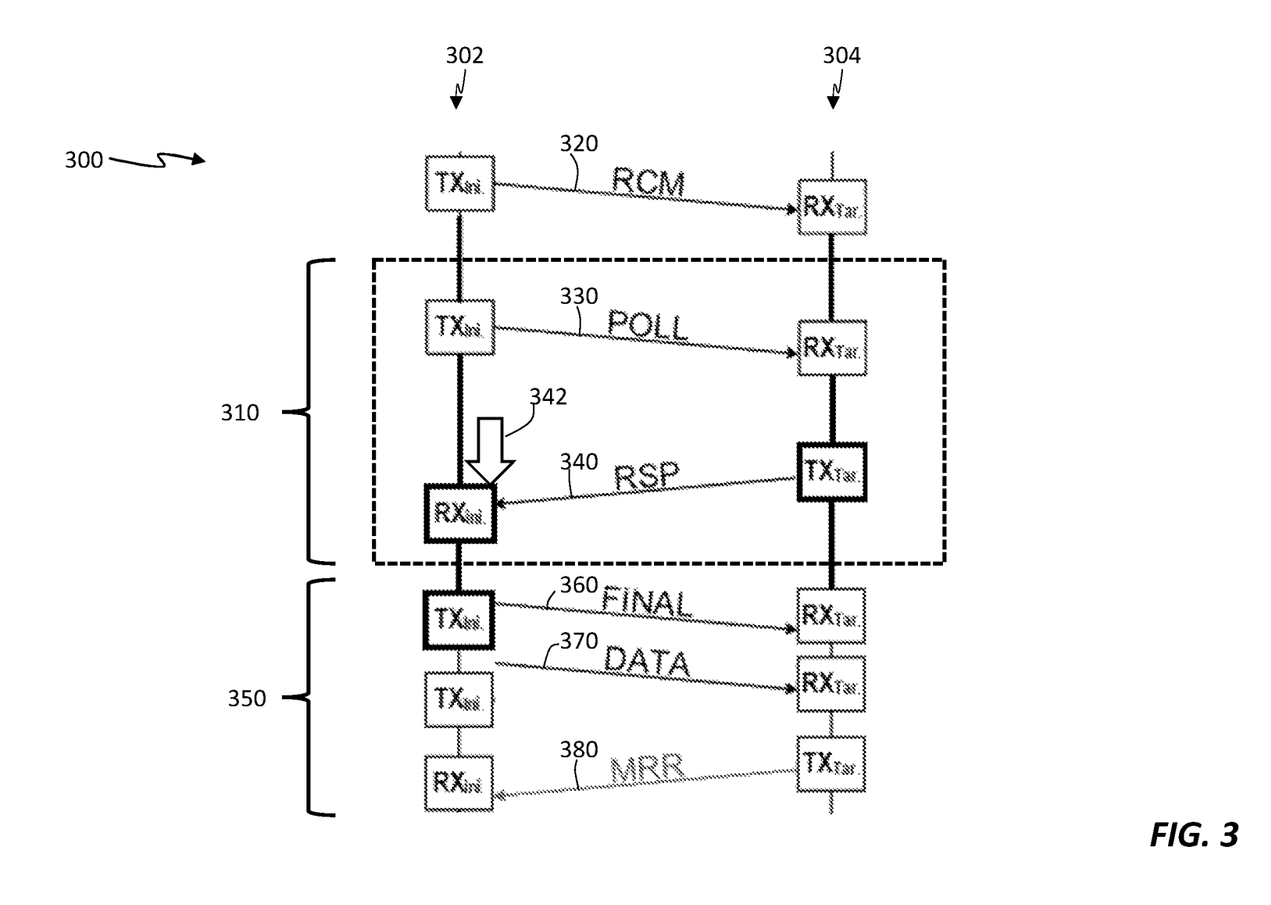
FIG. 3 shows a sequence of communications 300 between a transmitter/initiator and a responder/target.

FIG. 3 shows a sequence of communications 300 between a transmitter or initiator 302 and a responder 304. Typically, the transmitter or initiator 302 is a moving device, such as the targets T1 240, T2 250 or T3 260, and the responder 304 may be a static (or relatively slow moving) device, such as an access terminal, or a vehicle. The sequence starts with first round 310. This may commence with a ranging control message (RCM), 320 which is transmitted from the initiator 302 to the responder 304. This may be followed by a second message from the initiator, which is generally described as a POLL, 330. Responder 304 responds with a response message RSP 340. The timing, and exact content of the response depends on the details of the UWB ranging protocol used. The strength 342 of this response signal RSP is measured by the initiator. According to embodiments of the present disclosure, the RSSI is measured at, or by, multiple antennae circuits, typically two, one from each of two different antenna pairs. The antenna pair having the antenna from which the stronger RSSI is measured is then selected a possible pair for angle of arrival measurements. As described above, in the case of three antenna pairs in a 120° arrangement, the antenna pair having the antenna from which a stronger RSSI is measured may be used immediately for the subsequent measurements: in the case of four antenna pairs in a 90° arrangement, a subsequent round of measurements may be made. This subsequent round of measurements may generally include a second POLL 330 and response 340, or a second RCM 320 and response 340. The antenna pair including the antenna providing the stronger RSSI from the first of subsequent round is selected based on the strongest RSSI between the two sets of measurements.

It will be appreciated, that for pure distance ranging, in which an angle of arrival is not required, only a single antenna is needed. The response 340 (which typically, according to UWB protocols includes information relating to the poll 330), may then be processed by a processor which is either part of the receiver or connected to the receiver, in order to provide ranging information at the initiator 302.

However, for UWB ranging including angle of arrival, at least two antennae in a single antenna pair or antenna array (also known as sector) are required. The RSSIs at the various individual antenna allow, as described above, selection of an appropriate antenna pair or antenna array to be selected for the second round of UWB measurements 350. The details of the second round may vary according to the specific UWB protocols being used. Typically includes a final signal sent from the initiator 302 to the responder 304, and optionally may include a further transmission of data 370 from the initiator 302 to responder 304. A shown, the ranging communication may include a yet further optional communication 380 "MRR" (Measured Range Response) from the responder having the antenna array or arrays, to the initiator (mobile device) to inform the latter of the ranging results, Turning now to FIG. 7, this shows a flowchart of a method according to one or more embodiments, in which there are three antenna array or sectors. The process starts at step 710, and proceeds by determining, from a signal from the target, a first RSSI from a first antenna of a first of the antenna arrays and determining, from the signal from the target, a second RSSI from a second antenna of a second of the antenna arrays; ("720, determine RSSI from 512, 524"). At step 725 it is determined whether the RSSI from the first antenna 512 is greater than the RSSI from the second antenna 524.

Figure 7:
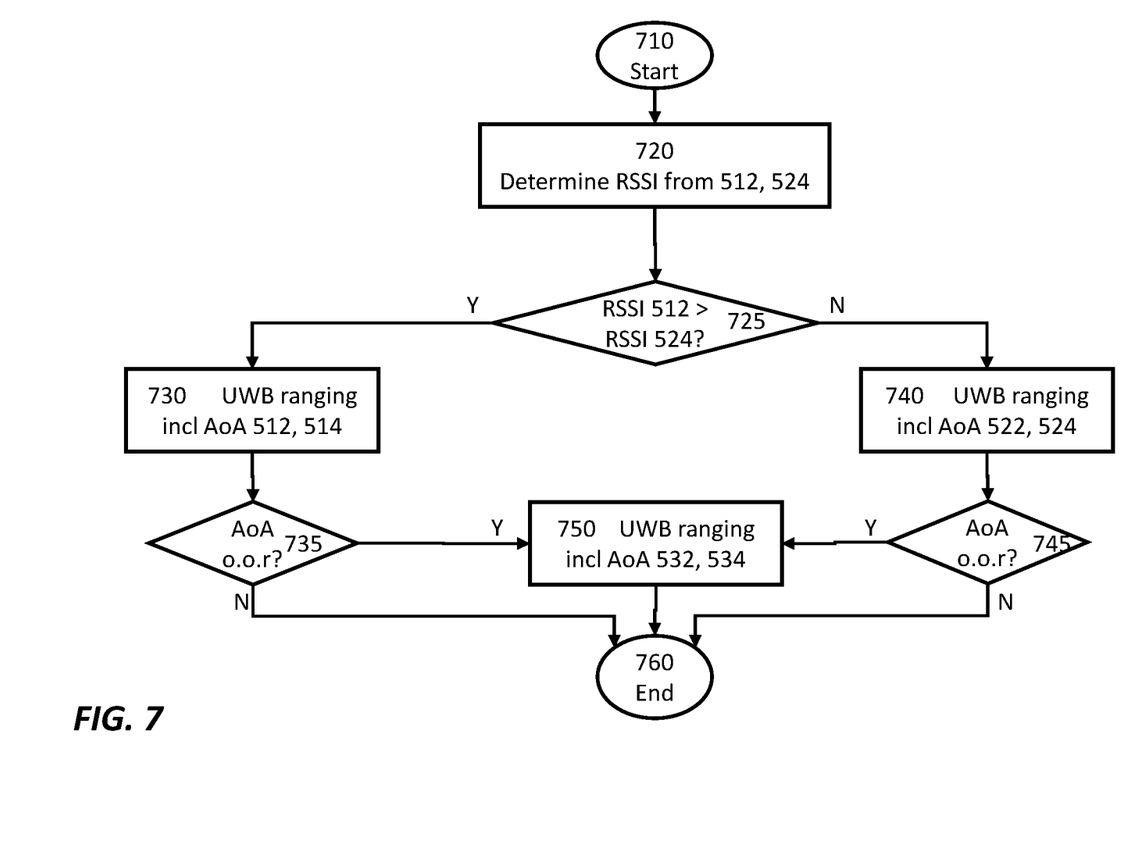
FIG. 7, shows a flowchart of a method according to one or more embodiments.

It continues by, in response to the first RSSI being larger than the second RSSI, selecting the first antenna array, and selecting the second antenna array otherwise. Using the selected antenna array, performing a UWB ranging measurement including measuring an angle of arrival of the signal from the target, as shown at 730 ("UWB ranging including angle of arrival on antennae 512, 514") in the instance that the first antenna array is selected, and as shown at 740 ("UWB ranging including angle of arrival on antennae 522, 524") in the instance that the second antenna array is selected.

In the event that measuring an angle of arrival of the signal from the target producing a null, or the measured angle of arrival falling outside of a predetermined field of view of the selected antenna array (shown at 735 for the measurements using the first antenna array, and at 745 for the case of measurements using the second antenna array), the method continues by selecting the other, third, antenna array 532, 534, as a presently-selected antenna array, and using the presently-selected antenna array, performing a UWB ranging measurement including measuring an angle of arrival of the signal from the target (as shown at 750). The method then ends, as shown at 760.

In the opposite event, that the measured angle of arrival of the signal from the target falls within the predetermined field of view, the method ends, again as shown at 760.

Figure 8:
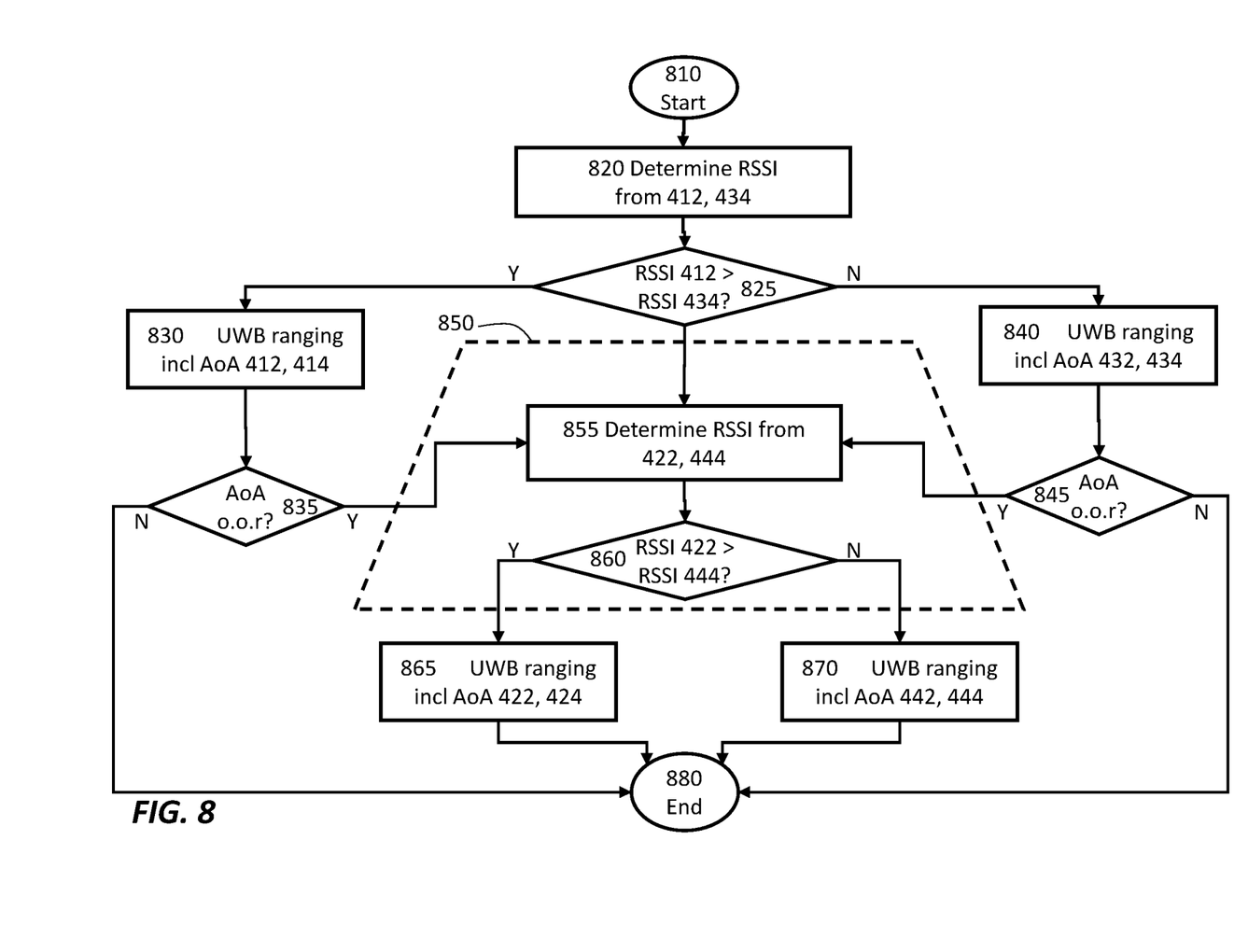
FIG. 8 shows a flowchart of a method according to one or more other embodiments.

FIG. 8 shows a flowchart of a method according to one or more other embodiments, in which there are four antenna arrays or sectors, being first, second, third and fourth antenna arrays. This method starts at 810 and proceeds by determining, from a signal from the target, a first RSSI from a first antenna of a first of the antenna arrays, and determining from the signal from the target a second RSSI from a second antenna of a second of the antenna arrays (at shown at 820). The method proceeds by, in response to the first RSSI being larger than the second RSSI, selecting the first antenna array, and selecting the second antenna array otherwise (as shown by the legs directing towards 830 and 840 in FIG. 8).

The method proceeds by, using the selected antenna array, performing a UWB ranging measurement including measuring an angle of arrival of the signal from the target (as shown at 830 and 840). The method continues by determining (at either 835 or 845 depending on which antenna array is selected), whether measuring an angle of arrival of the signal from the target either produces a result which is null or falls outside of a predetermined field of view of the selected antenna array, in which case the method continues with a subroutine 850. In the alternative case in which the angle of arrival of the signal from the target falls within the predetermined field of view of the selected antenna array, the method ends as shown at 880.

Subroutine 850 comprises selecting a one of the plurality of antennae arrays different from the first and second antenna arrays, as a presently-selected antenna array. That is to say, either the third or fourth antenna array is to be selected. The choice of which of the third and fourth antenna arrays should be selected as the presently-selected array is made as follows; determining a third received signal strength indication, RSSI, from a third antenna of the third antenna array, and determining a fourth RSSI from a fourth antenna of the fourth antenna array, (as shown at 855). In response to the third RSSI being larger than the fourth RSSI, selecting the third antenna array as a presently-selected antenna array (shown as the leg towards step 865), and selecting the fourth antenna array as the presently-selected antenna array otherwise (shown as the leg towards step 870).

The method proceeds by, using the presently-selected antenna array, performing a UWB ranging measurement including measuring an angle of arrival of a signal from the target. This is shown at step 865 in the case of the third antenna array comprising antennae 422 and 424, and at step 870 in the case of the fourth antenna array comprising antennae 442 and 444). The method then ends, again as shown at 880.

From reading the present disclosure, other variations and modifications will be apparent to the skilled person. Such variations and modifications may involve equivalent and other features which are already known in the art of UWB ranging, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

In the context of the present disclosure, the term "ranging measurement" should be interpreted broadly so as to include one or both of, firstly, determining a distance and in particular a scaler distance between two objects, being the target and the plurality of antenna arrays, and secondly determining an angle of arrival of the signal from the targets to a plane of an antenna array or sector.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

LIST OF REFERENCE SIGNS 110 antenna pair AP1
120 antenna pair AP2
130 antenna pair AP3
140 field of view of AP1
150 field of view of AP2
160 field of view of AP3
210 antenna pair AP1
220 antenna pair AP2
230 antenna pair AP3
240 target T1
250 target T2
260 target T3
270 first receiver R1
280 second receiver R2
300 sequence of communications
302 transmitter or initiator
304 responder
310 first round
320 ranging control message RCM
330 poll POLL
340 response message RSP
342 RSSI measurement
350 second round
360 final message from initiator (FINAL)
370 optional message from responder (DATA)
380 MRR message
400 arrangement of antenna pairs
410 first antenna pair AP1

412 first antenna of first antenna pair
414 second antenna of first antenna pair
420 second antenna pair AP2
422 first antenna of second antenna pair
424 second antenna of second antenna pair
430 third antenna pair AP3
432 first antenna of third antenna pair
434 second antenna of third antenna pair
440 fourth antenna pair AP4
442 first antenna of fourth antenna pair
444 second antenna of fourth antenna pair
450 target
510 first antenna array AA1
512 first antenna of first antenna array
514 second antenna of first antenna array
516 third antenna of first antenna array
520 second antenna array AA2
522 first antenna of second antenna array
524 second antenna of second antenna array
526 third antenna of second antenna array
530 third antenna array AA3
532 first antenna of third antenna array
534 second antenna of third antenna array
536 third antenna of third antenna array
540 receiver pair
542 first receiver
544 second receiver
552, 554, 556 120° angular separation
600 schematic physical arrangement
610 first antenna array
612 first antenna of first antenna array ANT1
614 second antenna of first antenna array ANT2
616 third antenna of first antenna array ANT3
620 second antenna array
622 first antenna of second antenna array ANT1
624 second antenna of second antenna array ANT2
626 third antenna of second antenna array ANT3
630 third antenna array
632 first antenna of third antenna array ANT1
634 second antenna of third antenna array ANT2
636 third antenna of third antenna array ANT3
640 receiver pair
641 first receiver antenna input Rx1
642 second receiver antenna input Rx1
643 transmitter antenna output Tx
650 part of routing array
652, 654 SP3T switch
656 SPDT switch
660 other part of routing array
662, 664, 666 switch
710 start
715 determine RSSI from 512
720 determine RSSI from 524
725 is RSSI (512)>RSSI 524 ?
730 UWB ranging including AoA from 512, 514
735 is AoA out of range
740 UWB ranging including AoA from 522, 524
745 is AoA out of range
750 UWB ranging including AoA from 532, 534
760 end
810 start
815 determine RSSI from 412
820 determine RSSI from 434
825 is RSSI (412) >RSSI 434 ?
830 UWB ranging including AoA from 412, 414
835 is AoA out of range
840 UWB ranging including AoA from 432, 434
845 is AoA out of range
850 determine RSSI from 422
855 determine RSSI from 444
860 is RSSI (422) >RSSI 444 ?
865 UWB ranging including AoA from 424, 424
870 UWB ranging including AoA from 442, 444
880 end

The invention claimed is:

1. A method of ultrawide band, UWB, ranging of a target using a plurality of antenna arrays, the method comprising:
determining, from a signal from the target, a first received signal strength indicator, RSSI, from a first antenna of a first of said plurality of antenna arrays,
determining, from the signal from the target, a second RSSI from a second antenna of a second of said plurality of antenna arrays;
in response to the first RSSI being larger than the second RSSI, selecting the first antenna array, and selecting the second antenna array otherwise;
using the selected antenna array, performing a UWB ranging measurement including measuring an angle of arrival of the signal from the target;
wherein, in response to a one of:
measuring an angle of arrival of the signal from the target producing a null result,
and the measured angle of arrival falling outside of a predetermined field of view of the selected antenna array:
selecting a one of the plurality of antennae arrays different from the first and second antenna arrays, as a presently-selected antenna array;
and using the presently-selected antenna array, performing a UWB ranging measurement including measuring an angle of arrival of the signal from the target.

2. The method of claim 1, wherein each antenna array comprises at least 2 antennae arranged in a first alignment.

3. The method of claim 2, wherein each antenna array comprises at least 2 horizontally aligned antennae.

4. The method of claim 3 wherein the antenna arrays are oriented around a 360° virtual field of view.

5. The method of claim 1, wherein the plurality of antenna arrays is three antenna arrays, orientated at 120° to each other.

6. The method of claim 5, wherein each antenna array has a 120° field of view.

7. The method of claim 1, wherein the plurality of antenna arrays is four antenna arrays, being a first antenna array, a second antenna array, a third antenna array and a fourth antenna array.

8. The method of claim 7 wherein each antenna array has a 90° field of view.

9. The method of claim 7, wherein
selecting a one of the plurality of antennae arrays different from the first and second antenna arrays, as a presently-selected antenna array comprises:
determining a third received signal strength indication, RSSI, from a third antenna of the third antenna array,
determining a fourth RSSI from a fourth antenna of the fourth antenna array;
in response to the third RSSI being larger than the fourth RSSI, selecting the third antenna array as a presently-selected antenna array, and selecting the fourth antenna array as the presently-selected antenna array otherwise; and
using the presently-selected antenna array, performing a UWB ranging measurement including measuring an angle of arrival of a signal from the target.

10. A UWB apparatus, comprising:
a plurality of antenna arrays, each comprising a plurality of antennae;
received signal strength circuitry configured to determine a received signal strength indicator (RSSI) at an antenna of the plurality of antenna arrays;
a pair of receivers, each selectively connectable to any one of three or more antennae of the plurality of antenna arrays;
wherein the apparatus is configured to:
   determine, from a signal from a target, a first received signal strength indication, RSSI, from a first antenna of a first of said plurality of antenna arrays,
   determine from the signal from the target a second RSSI from a second antenna of a second of said plurality of antenna arrays;
   in response to the first RSSI being larger than the second RSSI, select the first antenna array, and select the second antenna array otherwise;
   using the selected antenna array, perform a UWB ranging measurement including measure an angle of arrival of the signal from the target; and
   in response to a one of:
      measuring an angle of arrival of the signal from the target producing an out-of-field-of-view result,
      and the measured angle of arrival falling outside of a predetermined field of view of the selected antenna array:
   select a one of the plurality of antennae arrays different from the first and second antenna arrays, as a presently-selected antenna array;
   and using the presently-selected antenna array, perform a UWB ranging measurement including measuring an angle of arrival of the signal from the target.

11. The UWB apparatus of claim 10, wherein each antenna array comprises at least 2 antennae arranged in a first alignment.

12. The UWB apparatus of claim 11, wherein each antenna array comprises at least 2 horizontally aligned antennae.

13. The UWB apparatus of claim 12 wherein the antenna arrays are oriented around a 360° virtual field of view.

14. The UWB apparatus of claim 10, wherein the plurality of antenna arrays is three antenna arrays, orientated at 120° to each other.

15. A method of ultrawide band, UWB, ranging of a target using a first, a second, and a third antenna array, the method comprising:
   determining a first received signal strength indication, RSSI, from a first antenna of the first antenna array;
   determining a second RSSI from a second antenna of the second antenna array;
   in response to the first RSSI being larger than the second RSSI, selecting the first antenna array, and selecting the second antenna array otherwise;
   using the selected antenna array, performing a UWB ranging measurement including measuring an angle of arrival of a signal from the target;
   wherein, in response to the measured angle of arrival falling outside of a predetermined field of view of the selected antenna array, the method further comprises:
   using the third antenna array, performing a UWB ranging measurement including measuring an angle of arrival of a signal from the target.

* * * * *